(12) United States Patent
Masubuchi

(10) Patent No.: US 9,410,499 B2
(45) Date of Patent: Aug. 9, 2016

(54) CONTROL SYSTEM FOR A MULTI-FUEL INTERNAL COMBUSTION ENGINE

(75) Inventor: Masahiko Masubuchi, Mishima (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 293 days.

(21) Appl. No.: 14/240,093

(22) PCT Filed: Aug. 24, 2011

(86) PCT No.: PCT/JP2011/069046
§ 371 (c)(1),
(2), (4) Date: Feb. 21, 2014

(87) PCT Pub. No.: WO2013/027276
PCT Pub. Date: Feb. 28, 2013

(65) Prior Publication Data
US 2014/0190447 A1 Jul. 10, 2014

(51) Int. Cl.
*F02D 41/30* (2006.01)
*F02D 41/40* (2006.01)
(Continued)

(52) U.S. Cl.
CPC .......... *F02D 41/403* (2013.01); *F02D 13/0238* (2013.01); *F02D 19/024* (2013.01); *F02D 19/0647* (2013.01); *F02D 19/0692* (2013.01); *F02D 19/081* (2013.01);
(Continued)

(58) Field of Classification Search
CPC ..... F02D 41/40; F02D 41/402; F02D 41/403; F02D 41/405; F02D 41/401; F02D 41/0027; F02D 41/0025; F02D 19/0642; F02D 19/0647; F02D 19/0692; F02D 19/0694; F02D 19/081; F02D 19/066; F02D 19/10; F02D 19/105; F02M 21/0215; F02M 37/0064; F02M 37/0088; F02M 43/00
USPC ............. 123/27 GE, 299, 300, 304, 575, 525, 123/526
See application file for complete search history.

(56) References Cited

U.S. PATENT DOCUMENTS 6,055,963 A * 5/2000 Brown ................ F02D 41/0027
123/525
6,202,601 B1 3/2001 Ouellette et al.
(Continued)

FOREIGN PATENT DOCUMENTS

JP 7-11983 A 1/1995
JP 11-148382 A 6/1999
(Continued)

*Primary Examiner* — Mahmoud Gimie
(74) *Attorney, Agent, or Firm* — Sughrue Mion, PLLC

(57) ABSTRACT

The present invention is intended to suppress generation of a misfire and an increase in the amount of emission of HC, in a multi-fuel internal combustion engine of compression ignition type using, as fuels, a liquid fuel which can be ignited by compression and a gas fuel which is lower in ignitability than the liquid fuel. In the invention, in the same operating state, in cases where the liquid fuel and the gas fuel are caused to combust with the liquid fuel being used as an ignition source, the equivalent ratio of a mixture in a cylinder is made to increase, in comparison with the case where only the liquid fuel is caused to combust, and the rate of the increase of the equivalent ratio with respect to the case where only the liquid fuel is caused to combust is made smaller, when an engine load is low in comparison with the time when the engine load is high, and when an engine rotational speed is low in comparison with the time when the engine rotational speed is high.

4 Claims, 6 Drawing Sheets

(51) Int. Cl.
*F02D 41/14* (2006.01)
*F02D 41/00* (2006.01)
*F02D 13/02* (2006.01)
*F02D 19/02* (2006.01)
*F02D 19/06* (2006.01)
*F02D 19/08* (2006.01)

(52) U.S. Cl.
CPC ....... *F02D 41/0025* (2013.01); *F02D 41/1475* (2013.01); *F02D 41/30* (2013.01); *F02D 41/0027* (2013.01); *F02D 2200/0611* (2013.01); *F02D 2200/101* (2013.01); *F02D 2200/1015* (2013.01); *Y02T 10/18* (2013.01); *Y02T 10/32* (2013.01); *Y02T 10/36* (2013.01)

(56) References Cited

U.S. PATENT DOCUMENTS

| | | |
|---|---|---|
| 2002/0078918 A1 | 6/2002 | Ancimer et al. |
| 2002/0166515 A1 | 11/2002 | Ancimer et al. |
| 2004/0118557 A1 | 6/2004 | Ancimer et al. |
| 2006/0254560 A1* | 11/2006 | Mann ...................... F02B 19/10 123/305 |

FOREIGN PATENT DOCUMENTS

| | | |
|---|---|---|
| JP | 2007-507641 A | 3/2007 |
| JP | 2010-133337 A | 6/2010 |

* cited by examiner

CONTROL SYSTEM FOR A MULTI-FUEL INTERNAL COMBUSTION ENGINE

CROSS REFERENCE TO RELATED APPLICATIONS

This application is a National Stage of International Application No. PCT/JP2011/069046 filed Aug. 24, 2011, the contents of which are incorporated herein by reference in their entirety.

TECHNICAL FIELD

The present invention relates to a control system for a multi-fuel internal combustion engine of compression ignition type which is able to perform mixed combustion of a plurality of kinds of fuels.

BACKGROUND ART

In the past, there have been developed multi-fuel internal combustion engines which are able to perform mixed combustion of a plurality of kinds of fuels such as a liquid fuel (e.g., light oil, gasoline, etc.) and a gas fuel (e.g., compressed natural gas, hydrogen gas, etc.).

For example, in Patent Document 1, there is disclosed a compression ignition type internal combustion engine which uses, as a main fuel, a gas fuel such as natural gas, propane, biogas, landfill gas, or hydrogen gas, etc., and as a pilot fuel, diesel fuel or dimethyl ether which self-ignites more easily than the main fuel. In the compression ignition type internal combustion engine described in Patent Document 1, the main fuel is injected into a cylinder in the intake stroke or in the early stage of the compression stroke, so that a pre-mixed gas is formed therein by the main fuel and intake air. At this time, the amount of the main fuel injected into the cylinder is limited in order to prevent knocking. Moreover, during the compression stroke, the pilot fuel is injected into the cylinder, and an additional amount of main fuel is injected into the cylinder in the vicinity of top dead center, in order to fulfill the load requirement of the engine.

In each of Patent Document 2 and Patent Document 3, there is disclosed a compression ignition type internal combustion engine using a liquid fuel and a gas fuel. In the compression ignition type internal combustion engine described in each of the second and third patent documents, the gas fuel is injected into an intake port from a gas injector. In addition, the timing for injecting the gas fuel from the gas injector is set between a point in time at which an exhaust valve was closed and a point in time at which an intake valve is closed, in the intake stroke.

In Patent Document 4, there is disclosed a compression ignition type internal combustion engine using light oil and natural gas. In addition, in Patent Document 4, there is also disclosed a system which controls the amount of natural gas to be supplied to the internal combustion engine according to the engine load of the internal combustion engine.

PRIOR ART DOCUMENTS

Patent Documents

Patent Document 1: Japanese patent application laid-open No. 2007-507641
Patent Document 2: Japanese patent application laid-open No. H11-148382
Patent Document 3: Japanese patent application laid-open No. H07-011983
Patent Document 4: Japanese patent application laid-open No. 2010-133337

SUMMARY OF THE INVENTION

Problems to be Solved by the Invention

In the multi-fuel internal combustion engines of the compression ignition type, by using, as fuels, a liquid fuel, which can be ignited by compression, and a gas fuel, which is lower in ignitability than the liquid fuel, it is possible to cause the liquid fuel and the gas fuel to be combusted or burned with the liquid fuel being used as an ignition source. In such multi-fuel internal combustion engines, there are two cases, i.e., one case where an internal combustion engine is operated by causing the combustion of only the liquid fuel, and the other case in which an internal combustion engine is operated by causing the combustion of the liquid fuel and the gas fuel.

Here, in the same operating state, an equivalent ratio of a mixture (stoichiometric air fuel ratio/actual air fuel ratio), which is optimal for the combustion of only the liquid fuel, is different from that which is optimal for the combustion of the liquid fuel and the gas fuel. For that reason, when the equivalent ratio of a mixture in a cylinder with respect to an operating state of an internal combustion engine is controlled in a uniform manner, there will be a fear of causing generation of a misfire or an increase in the amount of emission of hydrocarbon (HC).

The present invention has been made in view of the problems as mentioned above, and has for its object to suppress generation of a misfire and an increase in the amount of emission of HC, in a multi-fuel internal combustion engine of compression ignition type using, as fuels, a liquid fuel which can be ignited by compression and a gas fuel which is lower in ignitability than the liquid fuel.

Means for Solving the Problems

In the present invention, in a multi-fuel internal combustion engine of compression ignition type, in cases where a liquid fuel and a gas fuel are caused to combust with the liquid fuel being used as an ignition source, the equivalent ratio of a mixture in a cylinder is made to increase, and the rate of the increase thereof is changed according to an operating state of the engine, as compared with the case where only the liquid fuel is caused to combust.

More specifically, a control system for a multi-fuel internal combustion engine according to the present invention resides in a control system for a multi-fuel internal combustion engine of compression ignition type which uses a liquid fuel being able to be ignited by compression, and a gas fuel being lower in ignitability than the liquid fuel, and which is provided with an equivalent ratio control unit in which in the same operating state, in cases where the liquid fuel and the gas fuel are caused to combust with the liquid fuel being used as an ignition source, the equivalent ratio of a mixture in a cylinder is made to increase, in comparison with the case where only the liquid fuel is caused to combust, and the rate of the increase of the equivalent ratio with respect to the case where only the liquid fuel is caused to combust is made smaller, when an engine load is low in comparison with the time when the engine load is high, or when an engine rotational speed is low in comparison with the time when the engine rotational speed is high.

According to the present invention, in cases where the liquid fuel and the gas fuel are caused to combust, too, or in cases where only the liquid fuel is caused to combust, too, it is possible to suppress the generation of a misfire as well as the increase in the amount of emission of HC. In addition, in cases where the liquid fuel and the gas fuel are caused to combust, when the engine load is relatively low, or when the engine rotational speed is relatively low, it is possible to suppress the concentration of oxygen around the liquid fuel used as the ignition source from becoming locally low to an excessive extent.

When the engine load is very low and the engine rotational speed is very low, in cases where the liquid fuel and the gas fuel are caused to combust, if the equivalent ratio of the mixture in the cylinder is made to increase, it will be easy to generate a local excessive decrease in the oxygen concentration in a combustion chamber thereof. Accordingly, when the engine load is equal to or less than a prescribed load and the engine rotational speed is equal to or less than a prescribed rotational speed, in cases where the liquid fuel and the gas fuel are caused to combust, the equivalent ratio control unit may decrease the equivalent ratio of the mixture in the cylinder, as compared with the case where only the liquid fuel is caused to combust.

Here, the prescribed load and the prescribed rotational speed are each a threshold value of an operation region by which it can be judged that in cases where the liquid fuel and the gas fuel are caused to combust with the liquid fuel being used as the ignition source, when the equivalent ratio of the mixture in the cylinder is made to increase more than in the case where only the liquid fuel is caused to combust, a local excessive decrease in the oxygen concentration will occur in the combustion chamber of the cylinder. According to the above, in a low load and low rotation region, it is possible to suppress, with a higher probability, the oxygen concentration around the liquid fuel used as the ignition source from becoming locally low to an excessive extent.

In addition, a composition of the gas fuel to be supplied may change depending on a use environment of the multi-fuel internal combustion engine. Accordingly, the control system for a multi-fuel internal combustion engine according to the present invention may be further provided with a composition detection unit that serves to detect a composition of the mixture in the cylinder. Then, in cases where the liquid fuel and the gas fuel are caused to combust, the equivalent ratio control unit may change a rate of increase or a rate of decrease at the time of increasing or decreasing the equivalent ratio of the mixture in the cylinder more than in the case where only the liquid fuel is caused to combust, in accordance with the composition of the gas fuel detected by the composition detection unit. According to this, the effects as mentioned above can be obtained even in cases where the composition of the gas fuel to be supplied has changed.

Advantageous Effect of the Invention

According to the present invention, it is possible to suppress generation of a misfire and an increase in the amount of emission of HC, in a multi-fuel internal combustion engine of compression ignition type using, as fuels, a liquid fuel which can be ignited by compression and a gas fuel which is lower in ignitability than the liquid fuel.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Schematic Construction

Figure 1:
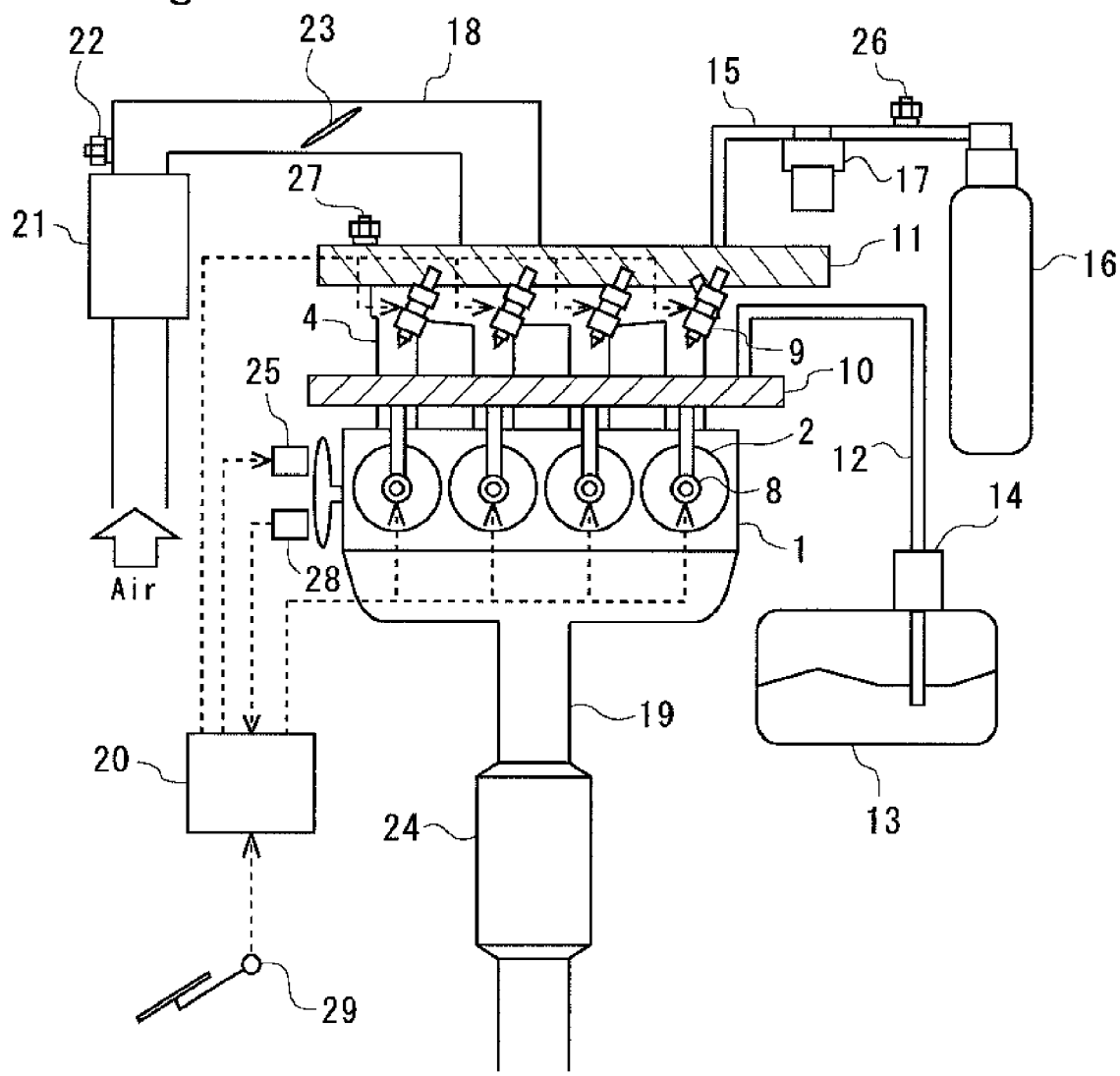
FIG. 1 is a view showing the schematic construction of an internal combustion engine as well as its fuel system and its intake and exhaust systems according to a first embodiment of the present invention.

FIG. 1 is a view showing the schematic construction of an internal combustion engine as well as its fuel system and its intake and exhaust systems according to an embodiment of the present invention. The internal combustion engine 1 is an engine for driving a vehicle, which is able to use light oil and compressed natural gas (hereinafter referred to as CNG) as fuels. The internal combustion engine 1 is a compression ignition type internal combustion engine. The internal combustion engine 1 can be operated by combusting or burning light oil and CNG in a mixed manner, or can also be operated by combusting or burning only light oil. Here, note that in this embodiment, the light oil corresponds to a liquid fuel according to the present invention, and the CNG corresponds to a gas fuel according to the present invention.

The internal combustion engine 1 has four cylinders 2. An intake port 4 and an exhaust port (not shown) are connected to a combustion chamber in an upper portion of the interior of each cylinder 2. An opening portion of the intake port 4 to the combustion chamber is opened and closed by an intake valve, and an opening portion of the exhaust port to the combustion chamber is opened and closed by an exhaust valve. An intake passage 18 is connected to the intake port 4. An exhaust passage 19 is connected to the exhaust port.

In the intake passage 18, there are arranged an air cleaner 21, an air flow meter 22 and a throttle valve 23 sequentially in this order from an upstream side along the flow of air (fresh air). The air flow meter 22 detects an amount of intake air sucked into the internal combustion engine 1. The throttle valve 23 controls the amount of intake air in the internal combustion engine 1 by changing the cross-sectional area of the intake passage in a direction which crosses at right angles with the direction of flow of the intake air in the intake passage. An exhaust gas purification device 24 is arranged in the exhaust passage 19. The exhaust gas purification device 24 is composed of an exhaust gas purification catalyst such as an oxidation catalyst, a NOx storage reduction catalyst, etc., and a particulate filter or the like which serves to trap particulate matter in the exhaust gas.

Each of the cylinders 2 is provided with a light oil injector 8 that directly injects light oil into a corresponding cylinder 2. The individual light oil injectors 8 are connected to a light oil common rail 10. A light oil supply passage 12 has one end thereof connected to the light oil common rail 10. The light oil supply passage 12 has the other end thereof connected to a light oil tank 13. A pump 14 is arranged in the light oil supply passage 12. Light oil is pressure fed from the light oil tank 13 to the light oil common rail 10 through the light oil supply passage 12 by means of the pump 14. Then, the light oil pressurized in the light oil common rail 10 is supplied to the individual light oil injectors 8, respectively.

In addition, in the internal combustion engine 1, there are also provided CNG injectors 9 for injecting CNG into intake ports 4 of the individual cylinders 2, respectively. The individual CNG injectors 9 are connected to a CNG delivery pipe 11. A CNG supply passage 15 has one end thereof connected to the CNG delivery pipe 11. The CNG supply passage 15 has the other end thereof connected to a CNG tank 16. CNG is supplied from the CNG tank 16 to the CNG delivery pipe 11 through the CNG supply passage 15. Then, the CNG is supplied from the CNG delivery pipe 11 to the individual CNG injectors 9, respectively.

A regulator 17 is arranged in the CNG supply passage 15. The pressure of the CNG to be supplied to the CNG delivery pipe 11 is regulated by the regulator 17. A pressure sensor 26 is arranged in the CNG supply passage 15 at the upstream side of the regulator 17, and a pressure sensor 27 is arranged in the CNG delivery pipe 11. These pressure sensors 26, 27 serve to detect the pressure of CNG inside the CNG supply passage 15 and the pressure of CNG inside the CNG delivery pipe 11, respectively.

In cases where the internal combustion engine 1 is operated by carrying out mixed combustion of light oil and CNG, first, CNG is injected into an intake port 4 of each cylinder 2 from a corresponding CNG injector 9. As a result of this, a pre-mixed gas of intake air (air) and CNG is formed, and the pre-mixed gas is supplied into each cylinder 2. Then, in each cylinder 2, in the vicinity of compression top dead center, light oil is injected into the cylinder 2 from a corresponding light oil injector 8. When the light oil is self-ignited, a flame propagates in a combustion chamber. As a result of this, the light oil and the CNG are combusted or burned. In other words, the CNG is combusted using the light oil as an ignition source.

Moreover, the internal combustion engine 1 is provided with an intake side variable valve drive mechanism 25. The intake side variable valve drive mechanism 25 is a mechanism which is able to control the valve timing of each intake valve in a variable manner. The amount of air in each cylinder 2 can be regulated by changing the valve closing timing of the corresponding intake valve by means of the intake side variable valve drive mechanism 25.

More specifically, a reference valve closing timing of an intake valve is set to be a point in time later than bottom dead center of the compression stroke. At this time, when the valve closing timing of the intake valve is advanced to the bottom dead center side of the compression stroke, the amount of the air flowing back from the interior of the corresponding cylinder 2 to its intake port 4 will be decreased. As a result, the amount of air in the cylinder 2 can be increased. In this case, the equivalent ratio of the mixture in the cylinder 2 decreases. On the other hand, when the valve closing timing of the intake valve is further retarded from the reference valve closing timing, the amount of the air flowing back from the interior of the cylinder 2 into the intake port 4 will be increased. As a result, the amount of the air in the cylinder 2 can be decreased. In this case, the equivalent ratio of the mixture in the cylinder 2 increases.

Here, note that the intake side variable valve drive mechanism 25 may be a mechanism that changes the opening and closing timing, without changing the angle of action of the intake valve. In addition, the intake side variable valve drive mechanism 25 may be a mechanism that is able to change not only the opening and closing timing of the intake valve but also its angle of action. In this case, only the valve closing timing of the intake valve can be changed, without changing the valve opening time of the intake valve.

An electronic control unit (ECU) 20 is provided in combination with the internal combustion engine 1. The air flow meter 22 and the pressure sensors 26, 27 are electrically connected to the ECU 20. Moreover, a crank angle sensor 28 and an accelerator opening sensor 29 are electrically connected to the ECU 20. The output signals of these sensors are inputted to the ECU 20.

The crank angle sensor 28 detects a crank angle of the internal combustion engine 1. The accelerator opening sensor 29 detects a degree of opening of an accelerator of the vehicle on which the internal combustion engine 1 is mounted. The output signals of these individual sensors are inputted to the ECU 20. The ECU 20 calculates an engine rotational speed of the internal combustion engine 1 based on the output signal of the crank angle sensor 28, and also calculates an engine load of the internal combustion engine 1 based on the output signal of the accelerator opening sensor 29.

In addition, the light oil injectors 8, the CNG injectors 9, the pump 14, the regulator 17, the throttle valve 23, and the intake side variable valve drive mechanism 25 are electrically connected to the ECU 20. Thus, these parts are controlled by the ECU 20.

[Equivalent Ratio Control]

In the internal combustion engine 1, in cases where only light oil is used as fuel, diffusion combustion of only the light oil is carried out in the interior of each cylinder 2. Here, there is a difference between an equivalent ratio of the mixture suitable for the diffusion combustion of only the light oil, and an equivalent ratio of the mixture suitable for the mixed combustion of the light oil and the CNG (i.e., an equivalent ratio of the mixture suitable for the propagation of flame in the CNG at the time of the combustion of the light oil and the CNG with the light oil being used as the ignition source). Specifically, in cases where the mixed combustion of light oil and CNG is carried out, when the equivalent ratio of the mixture in each cylinder 2 is controlled to a value suitable for the diffusion combustion of only light oil, the amount of oxygen will be too large, and as a result, there will be a fear that a misfire may occur. Also, in cases where the diffusion combustion of light oil is carried out, when the equivalent ratio of the mixture in each cylinder 2 is controlled to a value suitable for the mixed combustion of light oil and CNG, the amount of oxygen will become short, and as a result, there will be a fear that the amount of emission of HC may increase. In other words, the equivalent ratio of the mixture suitable for the mixed combustion of light oil and CNG is larger than that suitable for the diffusion combustion of light oil.

Figure 2A:
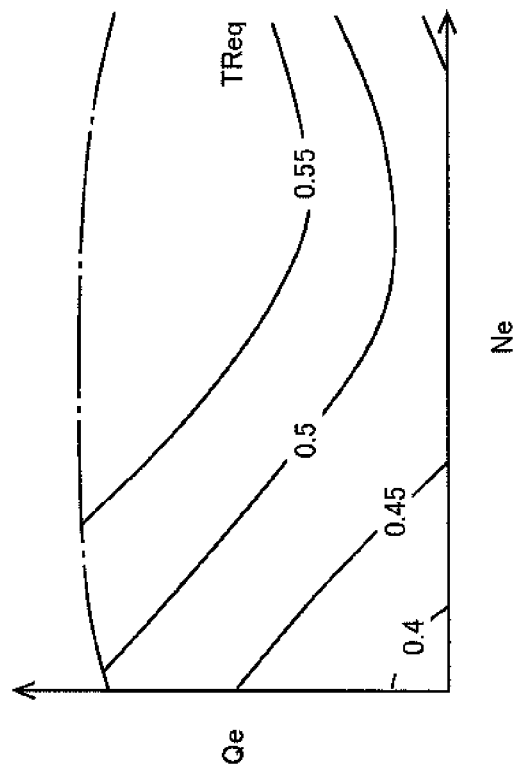
FIGS. 2A and 2B are views showing the relation between individual operating states of the internal combustion engine and corresponding target equivalent ratios of a mixture in a cylinder 2 according to the first embodiment of the present invention, wherein in FIG. 2A shows the relation of both in the case of performing diffusion combustion of only light oil, and in FIG. 2B shows the relation of both in the case of performing mixed combustion of light oil and CNG.
Figure 2B:
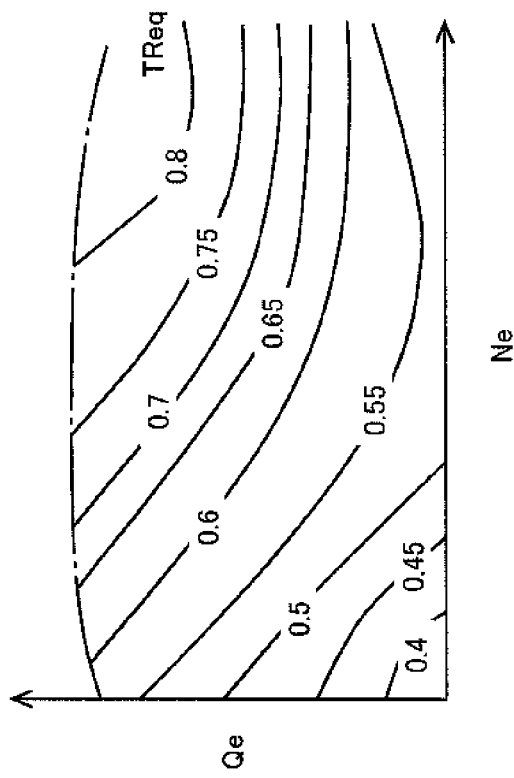

Accordingly, in this embodiment, the equivalent ratio of the mixture in each cylinder 2 can be controlled by regulating the valve closing timing of the corresponding intake valve by means of the intake side variable valve drive mechanism 25. FIG. 2 is a view showing the relation between individual operating states of the internal combustion engine 1 and corresponding target values of the equivalent ratio of the mixture in a cylinder 2 (hereinafter, referred to as target equivalent ratios) according to this embodiment of the present invention. FIG. 2A shows the relation of both in the case of performing diffusion combustion of only light oil, and FIG. 2B shows the relation of both in the case of performing mixed combustion of light oil and CNG. In FIGS. 2A and 2B, the axis of abscissa represents an engine rotational speed Ne, and the axis of ordinate represents an engine load Qe. Then, a numerical value on each curve indicate a target equivalent ratio TReq with respect to an operating state of the internal combustion engine 1.

The target equivalent ratio TReq with respect to the same engine load and the same number of engine revolutions per unit time in FIG. 2B is larger than that in FIG. 2A. In other words, in this embodiment, if the operating state of the internal combustion engine 1 is the same, in cases where the mixed combustion of light oil and CNG is carried out, the equivalent ratio of the mixture in a cylinder is made to increase, in comparison with the case where diffusion combustion of only light oil is carried out. As a result of this, in each of cases where the mixed combustion of light oil and CNG is carried out, and where the diffusion combustion of only light oil is carried out, it is possible to suppress generation of a misfire as well as an increase in the amount of emission of HC.

Moreover, the amount of air to be supplied into each cylinder 2 is smaller when the engine load is low than when it is high, and/or when the engine rotational speed is low than when it is high. For that reason, in cases where the mixed combustion of light oil and CNG is carried out, at the time when the equivalent ratio of the mixture in a cylinder 2 is increased, a shortage of oxygen for combustion becomes easier to occur when the engine load is low than when it is high, and/or when the engine rotational speed is low than when it is high.

For that reason, in cases where the mixed combustion of light oil and CNG is carried out, when the equivalent ratio of the mixture in the cylinder 2 is made to increase at a uniform rate with respect to the case where the diffusion combustion of only light oil is carried out, irrespective of the engine load or the engine rotational speed, there will be a fear that the concentration of oxygen around the light oil which becomes an ignition source may become locally low to an excessive extent when the engine load is relatively low, or when the engine rotational speed is relatively low.

Accordingly, in this embodiment, in cases where the mixed combustion of light oil and CNG is carried out, the rate of increase at the time of causing the equivalent ratio of the mixture in the cylinder 2 to increase with respect to the case where the diffusion combustion of only light oil is carried out is changed according to the engine load and the engine rotational speed.

The difference between the target equivalent ratios TReq in FIGS. 2A and 2B becomes smaller in accordance with the decreasing engine load and/or the decreasing engine rotational speed. In other words, in this embodiment, in cases where the mixed combustion of light oil and CNG is carried out, the rate of the increase of the equivalent ratio with respect to the case where the diffusion combustion of only light oil is carried out is made smaller when the engine load is low in comparison with the time when the engine load is high, and/or when the engine rotational speed is low in comparison with the time when the engine rotational speed is high. As a result of this, in cases where the mixed combustion of light oil and CNG is carried out, when the engine load is relatively low, or when the engine rotational speed is relatively low, it is possible to suppress the concentration of oxygen around the light oil used as the ignition source from becoming locally low to an excessive extent.

Figure 3:
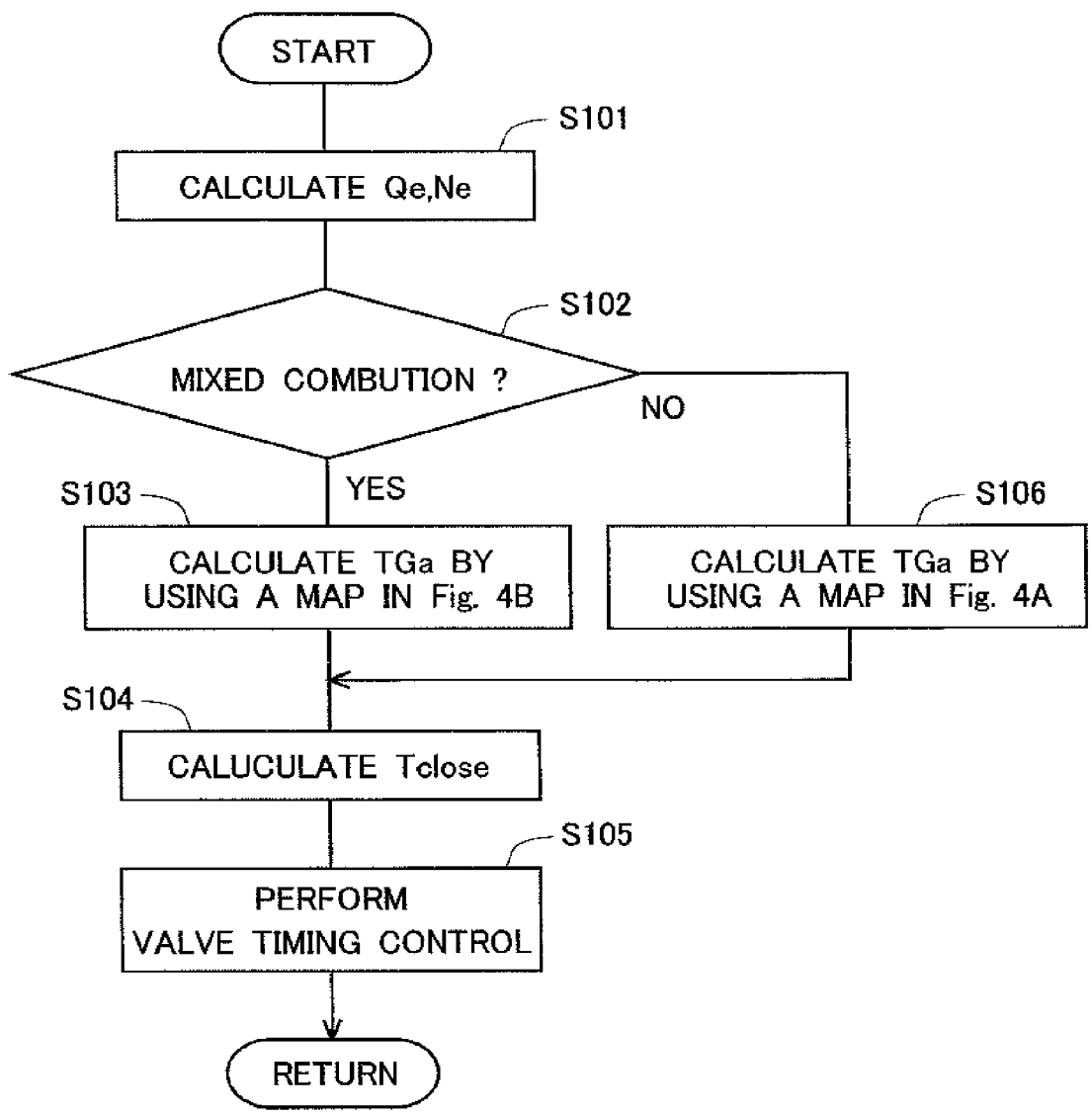
FIG. 3 is a flow chart showing a flow of equivalent ratio control according to the first embodiment of the present invention.

Hereinafter, reference will be made to equivalent ratio control according to this embodiment based on a flow chart shown in FIG. 3. This flow has been beforehand stored in the ECU 20, and is executed by the ECU 20 in a repeated manner.

In this flow, first in step S101, the engine load Qe and the number of revolutions per unit time Ne of the internal combustion engine 1 are calculated. Thereafter, in step S102, it is determined whether the mixed combustion of light oil and CNG is carried out in the internal combustion engine 1. In cases where an affirmative determination is made in step S102, the processing of step S103 is then carried out. On the other hand, in cases where a negative determination is made in step S102, i.e., in cases where the diffusion combustion of only light oil is carried out in the internal combustion engine 1, the processing of step S106 is then carried out.

Figure 4B:
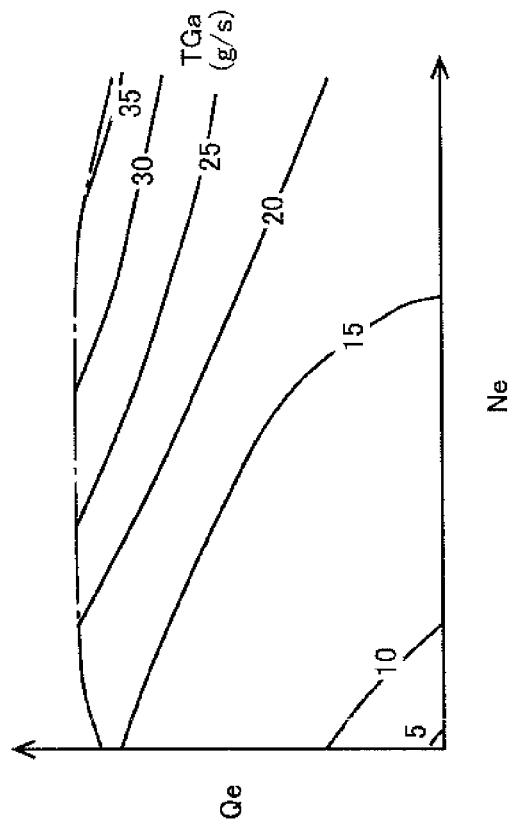
FIGS. 4A and 4B maps showing the relation between individual operating states of the internal combustion engine and corresponding target amounts of intake air according to the first embodiment of the present invention, wherein in FIG. 4A shows the relation of both in the case of performing diffusion combustion of only light oil, and in FIG. 4B shows the relation of both in the case of performing mixed combustion of light oil and CNG.
Figure 4A:
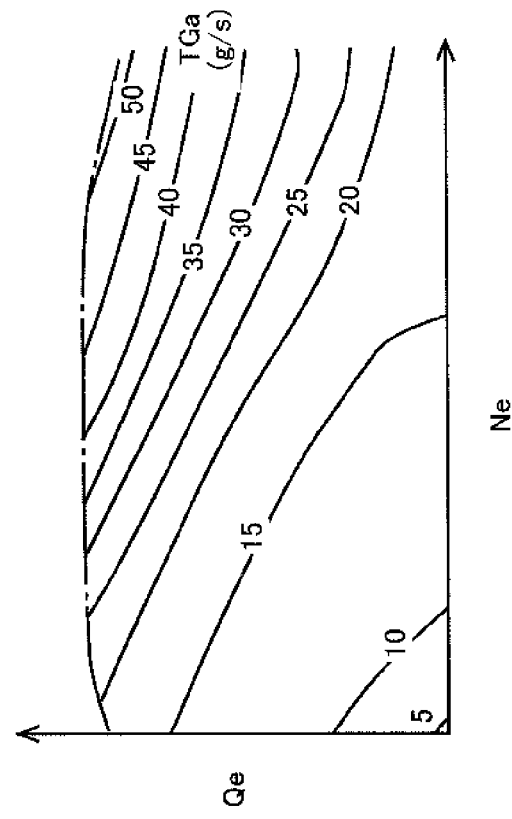

Here, in the ECU 20, there has been beforehand stored a map showing the relation between individual operating states of the internal combustion engine 1 and corresponding target amounts of intake air, as shown in FIG. 4. FIG. 4A shows the relation of both in the case of performing diffusion combustion of only light oil, and FIG. 4B shows the relation of both in the case of performing mixed combustion of light oil and CNG. In FIGS. 4A and 4B, the axis of abscissa represents the engine rotational speed Ne, and the axis of ordinate represents the engine load Qe. Then, a numerical value on each curve indicate a target amount of intake air TGa with respect to an operating state of the internal combustion engine 1.

The target amount of intake air TGa in FIG. 4A is set in such a manner that the equivalent ratio of the mixture in each cylinder 2 becomes a target equivalent ratio shown in FIG. 2A. In addition, the target amount of intake air TGa in FIG. 4B is set in such a manner that the equivalent ratio of the mixture in each cylinder 2 becomes a target equivalent ratio shown in FIG. 2B. Accordingly, the target amount of intake air TGa with respect to the same engine load and the same number of engine revolutions per unit time in FIG. 4B is smaller than that in FIG. 4A. Moreover, the lower the engine load, and/or the lower the engine rotational speed, the difference between the target amounts of intake air TGa in FIGS. 4A and 4B becomes smaller. Here, note that the relation between the operating state of the internal combustion engine 1 and the target amount of intake air as shown in FIGS. 4A and 4B may have been stored in the ECU 20 as a function.

In step S103, a target amount of intake air TGa is calculated by the use of the map shown in FIG. 4B. That is, the target amount of intake air TGa corresponding to a target equivalent ratio in the case of carrying out the mixed combustion of light oil and CNG is calculated. On the other hand, in step S106, a target amount of intake air TGa is calculated by the use of the map shown in FIG. 4A. That is, the target amount of intake air TGa corresponding to a target equivalent ratio in the case of carrying out the diffusion combustion of only light oil is calculated.

Subsequent to step S103, or subsequent to step S106, the processing of step S104 is carried out. In step S104, a target valve closing timing Tclose of an intake valve is calculated based on the target amount of intake air TGa calculated in step S103 or step S106. The relation between the target amount of intake air TGa and the target valve closing timing Tclose of the intake valve has been obtained in advance based on experiments, etc., and stored in the ECU 20 as a map or a function.

Then, in step S105, control of the valve timing by means of the intake side variable valve drive mechanism 25 is carried out in such a manner that the valve closing timing of the intake valve becomes the target valve closing timing Tclose calculated in step S104. As a result of this, in cases where the diffusion combustion of only light oil is carried out in the internal combustion engine 1, the equivalent ratio of the mixture in a cylinder 2 with respect to the operating state of the internal combustion engine 1 is controlled to be a target equivalent ratio as shown in FIG. 2A. On the other hand, in cases where the mixed combustion of light oil and CNG is carried out in the internal combustion engine 1, the equivalent ratio of the mixture in the cylinder 2 with respect to the operating state of the internal combustion engine 1 is controlled to be a target equivalent ratio as shown in FIG. 2B.

Consequently, according to this flow, if the operating state of the internal combustion engine 1 is the same, in cases where the mixed combustion of light oil and CNG is carried out, the equivalent ratio of the mixture in the cylinder 2 is made to increase, in comparison with the case where the diffusion combustion of only light oil is carried out. In addition, in cases where the mixed combustion of light oil and CNG is carried out, the rate of the increase of the equivalent ratio with respect to the case where the diffusion combustion of only light oil is carried out is made smaller when the engine load is low in comparison with the time when the engine load is high, and/or when the engine rotational speed is low in comparison with the time when the engine rotational speed is high.

Here, note that in place of the map shown in FIG. 4B, there may be used a map which shows the relation between the operating state of the internal combustion engine 1 and the amount of decrease of the target amount of intake air with respect to the case where the diffusion combustion of only light oil is carried out in the case of performing the mixed combustion of light oil and CNG.

[Modification]

Here, reference will be made to a modification of this first embodiment. As described above, in cases where the mixed combustion of light oil and CNG is carried out, at the time when the equivalent ratio of the mixture in a cylinder 2 is increased, a shortage of oxygen for combustion becomes easier to occur when the engine load is low than when it is high, and/or when the engine rotational speed is low than when it is high. For that reason, in a low load and low rotation region, when the equivalent ratio of the mixture in the cylinder 2 is made to increase more than that in the case of carrying out the diffusion combustion of only light oil, there will be a fear that the concentration of oxygen around the light oil used as an ignition source may become locally low to an excessive extent.

Accordingly, in this modification, in cases where the mixed combustion of light oil and CNG is carried out when the engine load is equal to or less than a prescribed load and the engine rotational speed is equal to or less than a prescribed rotational speed, the equivalent ratio of the mixture in the cylinder 2 is made to decrease more than in the case where the diffusion combustion of only light oil is carried out, contrary to when the engine load is higher than the prescribed load, or when the engine rotational speed is higher than the prescribed rotational speed. Here, the prescribed load and the prescribed rotational speed are each a threshold value of an operation region by which it can be judged that in cases where the mixed combustion of light oil and CNG is carried out, when the equivalent ratio of the mixture in the cylinder 2 is made to increase more than in the case where the diffusion combustion of only light oil is carried out, the concentration of oxygen around the light oil which becomes an ignition source in a combustion chamber of the cylinder becomes locally low to an excessive extent. These prescribed load and prescribed rotational speed can be beforehand obtained based on experiments, etc.

Here, note that in this modification, too, in cases where the equivalent ratio of the mixture in the cylinder 2 is made to decrease, the amount of intake air can be made to increase by advancing the valve closing timing of the intake valve by means of the intake side variable valve drive mechanism 25. In addition, the target amount of intake air at this time has been determined in advance and stored in the ECU 20.

According to this modification, in the low load and low rotation region, it is possible to suppress, with a higher probability, the oxygen concentration around liquid fuel used as the ignition source from becoming locally low to an excessive extent.

Second Embodiment

Schematic Construction

Figure 5:
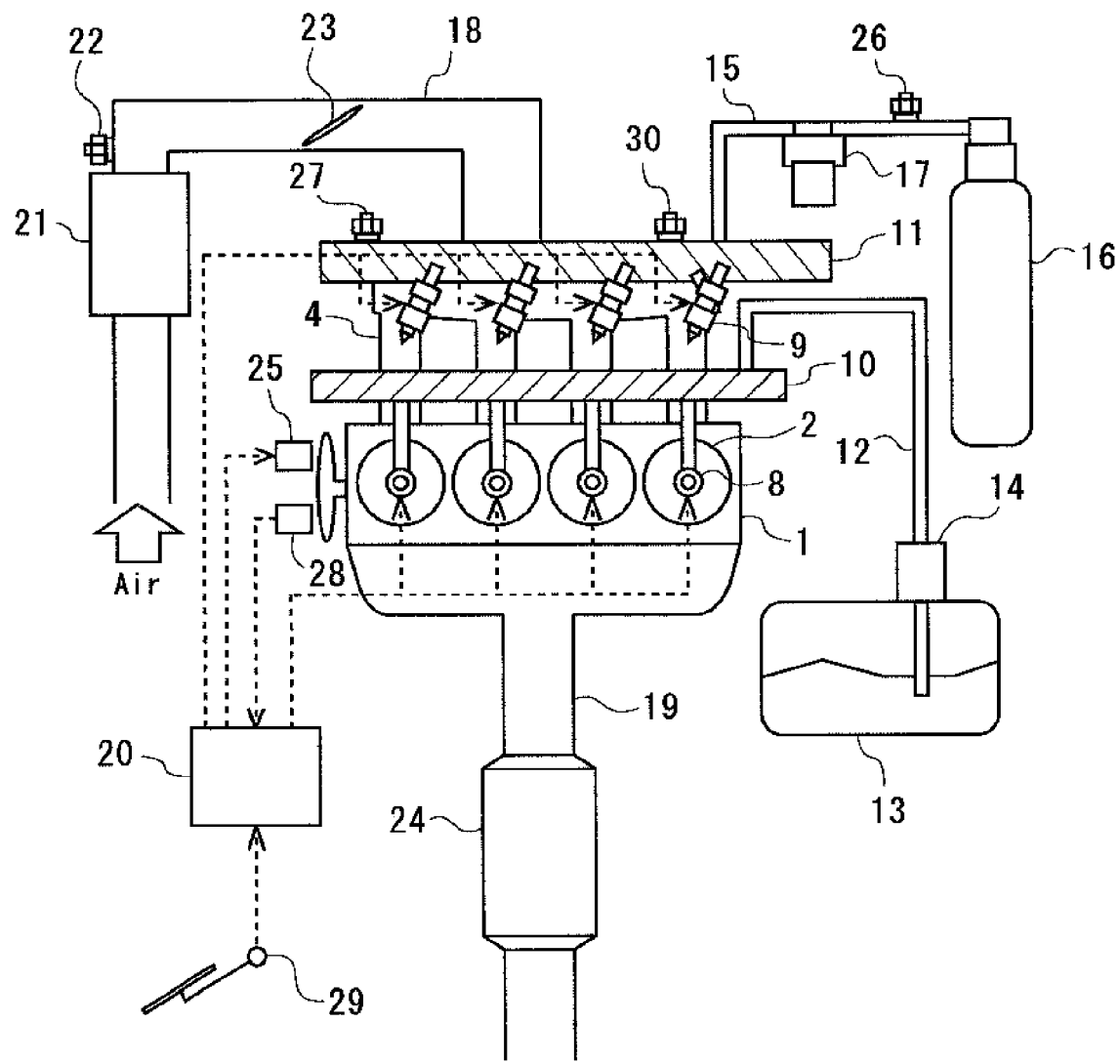
FIG. 5 is a view showing the schematic construction of an internal combustion engine as well as its fuel system and its intake and exhaust systems according to a second embodiment of the present invention.

FIG. 5 is a view showing the schematic construction of an internal combustion engine as well as its fuel system and its intake and exhaust systems according to this second embodiment of the present invention. Here, only a different construction of this second embodiment from the first embodiment will be explained.

In this embodiment, a composition sensor 30 for detecting the composition of CNG in a CNG delivery pipe 11 is arranged in the CNG delivery pipe 11. As the CNG composition sensor 30, there can be mentioned by way of example one which detects the composition of CNG by measuring a heat transfer characteristic, an electrical characteristic such as resistance, etc., an optical characteristic, or the like. The CNG composition sensor 30 is electrically connected to the ECU 20, and an output signal of the CNG composition sensor 30 is inputted to the ECU 20.

[Equivalent Ratio Control]

In this embodiment, too, similar to the first embodiment, if the operating state of the internal combustion engine 1 is the same, in cases where the mixed combustion of light oil and CNG is carried out, the equivalent ratio of the mixture in a cylinder 2 is made to increase, in comparison with the case where the diffusion combustion of only light oil is carried out. In addition, in cases where the mixed combustion of light oil and CNG is carried out, the rate of the increase of the equivalent ratio with respect to the case where the diffusion combustion of only light oil is carried out is made smaller when the engine load is low in comparison with the time when the engine load is high, and when the engine rotational speed is low in comparison with the time when the engine rotational speed is high.

Here, the composition of the CNG supplied to a CNG tank 16 may vary depending on a use environment of the internal combustion engine 1 (i.e., use area of a vehicle on which the internal combustion engine 1 is mounted, etc.). Then, a change in the composition of the CNG may change the equivalent ratio of the mixture suitable for the propagation of flame in the CNG. In other words, the equivalent ratio of the mixture suitable for the mixed combustion of light oil and CNG may change.

Accordingly, in this embodiment, in cases where the mixed combustion of light oil and CNG is carried out, the rate of increase at the time of causing the equivalent ratio of the mixture in the cylinder 2 to increase more than in the case where the diffusion combustion of only light oil is carried out is changed according to the composition of the CNG detected by the CNG composition sensor 30.

Specifically, the compositions of the CNG expected to be used are classified into a plurality of groups based on the equivalent ratios of the mixture suitable for the flame propagation thereof. Further, for each group, a map showing the relation between individual operating states of the internal combustion engine 1 and corresponding target amounts of intake air, as shown in FIG. 4B, has been prepared and stored in the ECU 20. Then, at the time of carrying out the mixed combustion of light oil and CNG, a target amount of intake air is calculated by using a map for a group to which the CNG actually used belongs.

By regulating the valve closing timing of an intake valve so as to control the amount of intake air in the internal combustion engine 1 to be the target amount of intake air calculated in the above manner, the equivalent ratio of the mixture in the cylinder 2 can be controlled to an equivalent ratio suitable for the flame propagating in the CNG actually used. Accordingly, even in cases where the composition of the CNG to be supplied to the CNG tank 16 has changed, it is possible to suppress the generation of a misfire and the increase in the amount of emission of HC at the time of carrying out the mixed combustion of light oil and CNG.

Figure 6:
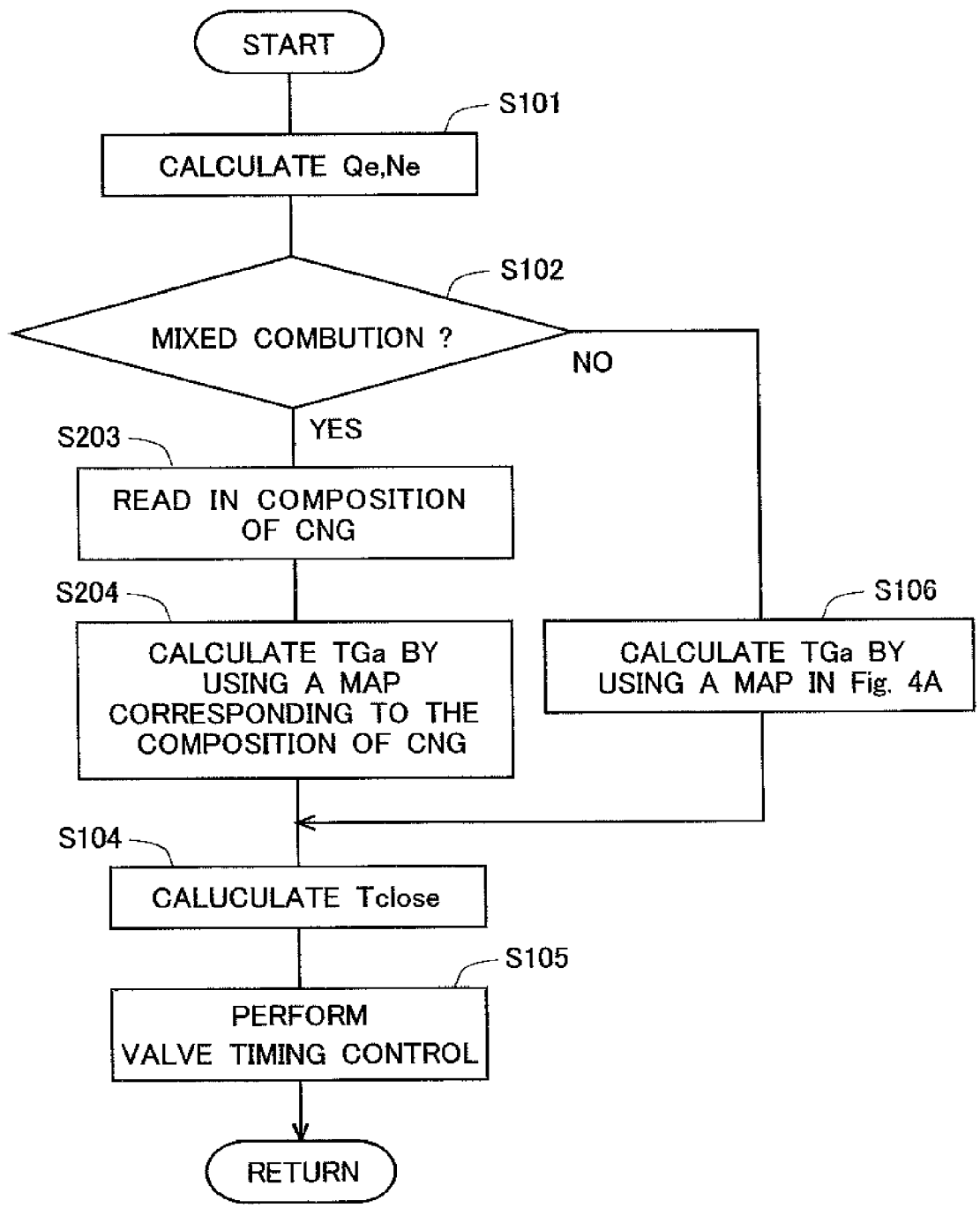
FIG. 6 is a flow chart showing a flow of equivalent ratio control according to the second embodiment of the present invention.

Hereinafter, reference will be made to equivalent ratio control according to this second embodiment based on a flow chart shown in FIG. 6. Here, note that this flow is such that the step S103 in the flow chart shown in FIG. 3 is replaced by steps S203 and S204. Therefore, only processing in steps S203 and S204 will be explained, and the explanation of the other steps will be omitted. This flow has been beforehand stored in the ECU 20, and is executed by the ECU 20 in a repeated manner.

In this flow, in cases where an affirmative determination is made in step S102, the processing of step S203 is then carried out. In step S203, the composition of the currently used CNG detected by the CNG composition sensor 30 is read.

Subsequently, in step S204, a map corresponding to the composition of the CNG read in step S203 is selected from the plurality of maps for the mixed combustion of light oil and CNG which have been stored in the ECU in advance, so that a target amount of intake air TGa is calculated by the use of the map thus selected. That is, the target amount of intake air TGa corresponding to a target equivalent ratio in the case of carrying out the mixed combustion of the light oil and the CNG currently used is calculated. Thereafter, the processing of step S104 is carried out.

Here, note that in this second embodiment, too, as in the modification of the first embodiment, in cases where the mixed combustion of light oil and CNG is carried out when the engine load is equal to or less than a prescribed load and the engine rotational speed is equal to or less than a prescribed rotational speed, the equivalent ratio of the mixture in the cylinder 2 may be made to decrease more than in the case where the diffusion combustion of only light oil is carried out. Then, the rate of decrease of the equivalent ratio of the mixture in the cylinder 2 at this time with respect to the case where the diffusion combustion of only light oil is carried out may be changed according to the composition of the CNG detected by the CNG composition sensor 30. In this case, too, similar to the above-mentioned flow, a map corresponding to the composition of the CNG currently used is selected from the plurality of maps, so that a target amount of intake air is calculated by the use of the map thus selected.

<Other Fuels in the Internal Combustion Engine>

Here, note that in the above-mentioned first and second embodiments, light oil and CNG are used as fuels in the internal combustion engine 1, but the liquid fuel and the gas fuel according to the present invention are not limited to these. The liquid fuel according to the present invention may be any fuel as long as it can be ignited by compression, and for example, it may be one in which light oil and GTL are mixed with each other. Also, the gas fuel according to the present invention may be one which can be combusted or burned with the liquid fuel being used as an ignition source, wherein propane gas and butane gas can be mentioned by way of example, other than CNG.

<Other Equivalent Ratio Control>

In addition, in the above-mentioned first and second embodiments, the amount of intake air is regulated by changing the valve closing timing of each intake valve by means of the intake side variable valve drive mechanism 25, whereby the equivalent ratio of the mixture in each cylinder 2 is controlled, but the method of controlling the equivalent ratio is not limited to this. For example, the amount of intake air may be regulated by changing the degree of opening of the throttle valve 23. However, when the degree of opening of the throttle valve 23 is decreased in order to decrease the amount of intake air, there will be a fear that a pumping loss in the internal combustion engine 1 may be increased. The increase in such a pumping loss can be suppressed by regulating the amount of intake air by changing the valve closing timing of each intake valve.

DESCRIPTION OF THE REFERENCE SIGNS

1 . . . internal combustion engine
2 . . . cylinder(s)
8 . . . light oil injector(s)
9 . . . CNG injector(s)
20 . . . ECU
23 . . . throttle valve
25 . . . intake side variable valve drive mechanism
28 . . . crank angle sensor
29 . . . accelerator opening sensor
30 . . . CNG composition sensor

The invention claimed is:

1. A control system for a multi-fuel internal combustion engine of compression ignition type which uses a liquid fuel being able to be ignited by compression, and a gas fuel being lower in ignitability than the liquid fuel,
wherein an equivalent ratio control unit is provided which, when the liquid fuel and the gas fuel are caused to combust with the liquid fuel being used as an ignition source, increases the equivalent ratio of a mixture in a cylinder, in comparison with the case where only the liquid fuel is caused to combust in the same operating state, and makes smaller the rate of the increase of the equivalent ratio with respect to the case where only the liquid fuel is caused to combust, when an engine load is low in comparison with the time when the engine load is high, and when an engine rotational speed is low in comparison with the time when the engine rotational speed is high.

2. The control system for a multi-fuel internal combustion engine as set forth in claim 1, wherein when the engine load is equal to or less than a prescribed load and the engine rotational speed is equal to or less than a prescribed rotational speed, in cases where the liquid fuel and the gas fuel are caused to combust, said equivalent ratio control unit decreases the equivalent ratio of the mixture in the cylinder, as compared with the case where only the liquid fuel is caused to combust.

3. The control system for a multi-fuel internal combustion engine as set forth in claim 1, further comprising:
   a composition detection unit that detects a composition of the gas fuel;
   wherein in cases where the liquid fuel and the gas fuel are caused to combust, said equivalent ratio control unit changes a rate of increase at the time of increasing the equivalent ratio of the mixture in the cylinder more than in the case where only the liquid fuel is caused to combust, in accordance with the composition of the gas fuel detected by said composition detection unit.

4. The control system for a multi-fuel internal combustion engine as set forth in claim 2, further comprising:
   a composition detection unit that detects a composition of the gas fuel;
   wherein in cases where the liquid fuel and the gas fuel are caused to combust with the liquid fuel being used as the ignition source, said equivalent ratio control unit changes a rate of increase or a rate of decrease at the time of increasing or decreasing the equivalent ratio of the mixture in the cylinder more than in the case where only the liquid fuel is caused to combust, in accordance with the composition of the gas fuel detected by said composition detection unit.

\* \* \* \* \*